Patented Aug. 8, 1933

1,921,867

UNITED STATES PATENT OFFICE 1,921,867

PRODUCTION OF POLYMERIZATION PRODUCTS OF DIOLEFINES

Georg Ebert, Friedrich August Fries, and Paul Garbsch, Ludwigshafen-on-the-Rhine, Germany, assignors to I. G. Farbenindustrie Aktiengesellschaft, Frankfort-on-the-Main, Germany No Drawing. Application June 10, 1930, Serial No. 460,287, and in Germany October 10, 1929

9 Claims. (Cl. 260—6)

This invention relates to improvements in the manufacture and production of polymerization products of diolefines.

It is already known that diolefines, as for example butadiene, isoprene or dimethylbutadiene or homologues or analogues thereof may be converted into polymerization products with alkali metals and alkaline earth metals. The polymerization however, sometimes proceeds very irregularly and often extremely turbulently. Very inhomogeneous and hard polymerization products are then obtained which only partly and frequently even very badly dissolve in the usual solvents, and their solutions are very viscous. These products can only be worked up on the rollers with great difficulty.

We have now found that the course of the polymerization of diolefines in the presence of metallic polymerizing agents, such as alkali metals and alkaline earth metals, their mixtures or alloys is rendered extremely uniform and quiet by adding to the diolefines to be polymerized small amounts of organic saturated or unsaturated mono- or poly-halogen compounds, such as ethylene chloride, ethylene bromide, 1.2-propylene chloride, vinyl chloride, vinyl bromide, cis-dichloroethylene trans-dichloroethylene and the like, and advantageously those which are liquid, or which are soluble in the diolefine or in the diluent. The polymerization commences in a very short time. The polymerization may be carried out with good results at between about 0° and 100° C., and preferably at between 15° and 65° C., although temperatures below or above this range may also be employed. The alkali metal or alkaline earth metal and the like employed is very well distributed in the resulting polymerization product which ensures that the further working up is easy. The resulting products are characterized by an excellent homogeneity and good plasticity. According to the amount of the additions of organic halogen compounds, products are obtained having a consistency ranging from plastic down to oily and even more mobile fluid products, the solutions of which of equal concentrations have higher or lower viscosities. As a rule the relative viscosity of the solutions of the product in a given solvent decreases with the amount of the halogen compound added. The polymerization products obtained are eminently suitable for very different purposes, as for example for the preparation of vulcanization products similar to those obtained by vulcanization of rubber of high tensile strength, or of products similar to hard rubber or similar products or of artificial silk, artificial wool, coatings, films, lacquers and the like. The products obtained may be converted by a hardening process or by another subsequent treatment into highly valuable products.

The process according to the present invention may also be carried out in the presence of solvents and/or diluents and/or cyclic diethers, unsaturated ethers or acetals and the like.

The following examples will further illustrate how the invention may be carried out in practice, but the invention is not restricted to these examples. The parts are by weight.

Example 1

A mixture of 1000 parts of butadiene and 2 parts of ethylene chloride is polymerized in a rotary autoclave in the presence of 4 parts of sodium. The reaction proceeds quietly and uniformly at a temperature of about 60° C. and is completed after 3 days. An extremely plastic polymerization product having good adhesiveness is obtained which is eminently suitable for the preparation of films and adherent coatings.

Example 2

500 parts of butadiene are polymerized with an addition of 2 parts of sodium and 0.25 part of ethylene chloride. The reaction proceeds quietly at a temperature of about 60° C. and is completed after 1½ days. The resulting product has a good plasticity and may be satisfactorily worked up into a soft resilient vulcanization product.

Example 3

1000 parts of butadiene are subjected to polymerization with an addition of 4 parts of sodium and 0.33 part of vinyl chloride which latter is dissolved in 3 parts of ether for more convenient handling. The reaction commences very soon, proceeds quietly at a temperature of about 60° C. and uniformly and is completed in 1½ days. A polymerization product of good plasticity, a 1 per cent benzene solution of which has the relative viscosity of 3.4, is obtained, which may be satisfactorily worked up into good resilient vulcanization products.

From the following table it may be seen that the properties of the polymerization products obtained according to the present invention may be influenced in a high degree by varying the amounts of the added materials.

| | Parts of butadiene | Parts of sodium | Parts of vinyl chloride | Temperatures in degrees centigrade | Time of polymerization in hours | Relative viscosity of a 1 percent solution of the polymerization product | Relative viscosity of a 5 percent solution of the polymerization product |
|---|---|---|---|---|---|---|---|
| (1) | 8000 | 24 | 0.8 | 60° | 36 | 15 | --------- |
| (2) | 8000 | 16 | 1.6 | 60° | 24 | 5 | --------- |
| (3) | 8000 | 24 | 8.0 | 60° | 24 | 2 | --------- |
| (4) | 4000 | 24 | 20.0 | 60° | 24 | --------- | 4 |
| (5) | 4000 | 48 | 40.0 | 60° | 14 | --------- | 2.3 |

What we claim is:

1. A process for the production of a polymerization product of butadiene, which comprises polymerizing butadiene in contact with sodium and vinyl chloride at a temperature of about 60° C.

2. In the production of a polymerization product from a diolefine in the presence, as polymerizing agent, of a metal selected from the group consisting of alkali metals and alkaline earth metals the step of polymerizing said diolefine in contact with a small amount of a halogen derivative of a hydrocarbon.

3. In the production of a polymerization product from a diolefine in the presence, as polymerizing agent, of a metal selected from the group consisting of alkali metals and alkaline earth metals the step of polymerizing said diolefine in contact with a small amount of a halogen derivative of a hydrocarbon at a temperature between 0° and 100° C.

4. In the production of a polymerization product from a diolefine in the presence, as polymerizing agent, of a metal selected from the group consisting of alkali metals and alkaline earth metals the step of polymerizing said diolefine in contact with a small amount of a halogen derivative of a hydrocarbon at a temperature between 15° and 65° C.

5. In the production of a polymerization product from a diolefine in the presence, as polymerizing agent, of sodium the step of polymerizing said diolefine in contact with a small amount of a halogen derivative of a hydrocarbon.

6. In the production of a polymerization product from butadiene in the presence, as polymerizing agent, of a metal selected from the group consisting of alkali metals and alkaline earth metals the step of polymerizing said butadiene in contact with a small amount of a halogen derivative of a hydrocarbon.

7. In the production of a polymerization product from a diolefine in the presence, as polymerizing agent, of a metal selected from the group consisting of alkali metals and alkaline earth metals the step of polymerizing said diolefine at a temperature between 0° and 100° C. in contact with a small amount of halogen derivative of an aliphatic hydrocarbon.

8. In the production of a polymerization product from a diolefine in the presence, as polymerizing agent, of a metal selected from the group consisting of alkali metals and alkaline earth metals the step of polymerizing said diolefine at a temperature between 0° and 100° C. in contact with vinyl chloride.

9. In the production of a polymerization product from a diolefine in the presence, as polymerizing agent, of a metal selected from the group consisting of alkali metals and alkaline earth metals the step of polymerizing said diolefine at a temperature between 0° and 100° C. in contact with ethylene chloride.

GEORG EBERT.
FRIEDRICH AUGUST FRIES.
PAUL GARBSCH.